United States Patent
Mashimo et al.

(10) Patent No.: US 11,346,413 B2
(45) Date of Patent: May 31, 2022

(54) FLOATING DISC BRAKE AND METHOD FOR ASSEMBLING SAME

(71) Applicant: AKEBONO BRAKE INDUSTRY CO., LTD., Tokyo (JP)

(72) Inventors: Shogo Mashimo, Tokyo (JP); Kohei Noma, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 62 days.

(21) Appl. No.: 16/765,573

(22) PCT Filed: Nov. 21, 2018

(86) PCT No.: PCT/JP2018/043051
§ 371 (c)(1),
(2) Date: May 20, 2020

(87) PCT Pub. No.: WO2019/103055
PCT Pub. Date: May 31, 2019

(65) Prior Publication Data
US 2020/0309209 A1    Oct. 1, 2020

(30) Foreign Application Priority Data

Nov. 21, 2017  (JP) .............................. JP2017-223406

(51) Int. Cl.
*F16D 65/097* (2006.01)
*B60T 1/06* (2006.01)
(Continued)

(52) U.S. Cl.
CPC .......... *F16D 65/0979* (2013.01); *B60T 1/065* (2013.01); *F16D 55/226* (2013.01);
(Continued)

(58) Field of Classification Search
CPC ............... F16D 65/0979; F16D 55/226; F16D 2055/0008; F16D 65/0056;
(Continued)

(56) References Cited

U.S. PATENT DOCUMENTS 4,082,166 A    4/1978  Ritsema
4,313,527 A    2/1982  Pickel
(Continued)

FOREIGN PATENT DOCUMENTS

CN    2468851 Y    1/2002
CN    201944151 U    8/2011
(Continued)

OTHER PUBLICATIONS

Extended European Search Report dated Jun. 2, 2021 in corresponding European patent application 18881224.2 (6 pages).
(Continued)

*Primary Examiner* — Pamela Rodriguez
(74) *Attorney, Agent, or Firm* — Faegre Drinker Biddle & Reath LLP

(57) ABSTRACT

A floating disc brake includes a yoke supported to the support in an axially movable manner, the yoke including a pad support portion that supports an outer pad on an axially outer side of the outer pad. The outer pad includes, on its axially outer surface, a pair of pad-side engagement portions formed of an elastic material. The pad support portion has a support hole that is open on at least an axially inner surface of the pad support portion, and the support hole is provided with a pair of yoke-side engagement portions on inner side surfaces of the support hole that face each other in a circumferential direction. The pair of pad-side engagement portions and the pair of yoke-side engagement portions are concavo-convex engaged with each other in the circumferential direction.

14 Claims, 12 Drawing Sheets

(51) Int. Cl.
*F16D 55/226* (2006.01)
*F16D 65/00* (2006.01)
*F16D 55/00* (2006.01)

(52) U.S. Cl.
CPC .. *F16D 65/0056* (2013.01); *F16D 2055/0008* (2013.01); *F16D 2055/0041* (2013.01); *F16D 2200/0021* (2013.01); *F16D 2250/0023* (2013.01); *F16D 2250/0084* (2013.01)

(58) Field of Classification Search
CPC ..... F16D 2055/0041; F16D 2200/0021; F16D 2250/0023; F16D 2250/0084; B60T 1/065
See application file for complete search history.

(56) References Cited

U.S. PATENT DOCUMENTS

| | | | |
|---|---|---|---|
| 4,560,037 A * | 12/1985 | Gumkowski | F16D 65/0979 188/73.38 |
| 5,113,978 A | 5/1992 | Weiler et al. | |
| 5,343,985 A | 9/1994 | Thiel et al. | |
| 5,701,978 A * | 12/1997 | Weiler | F16D 65/0979 188/73.32 |
| 5,860,495 A | 1/1999 | Weiler et al. | |
| 2001/0013448 A1 | 8/2001 | Schorn et al. | |
| 2002/0096404 A1* | 7/2002 | Storzel | F16D 65/0977 188/73.38 |
| 2013/0291418 A1 | 11/2013 | Mallmann et al. | |
| 2014/0360822 A1 | 12/2014 | Kobayashi et al. | |
| 2015/0354646 A1 | 12/2015 | Osada | |
| 2018/0274611 A1* | 9/2018 | Song | F16D 65/0972 |

FOREIGN PATENT DOCUMENTS

| | | |
|---|---|---|
| CN | 103261727 A | 8/2013 |
| CN | 103797266 A | 5/2014 |
| CN | 103912608 A | 7/2014 |
| CN | 105134827 A | 12/2015 |
| DE | A1-19652933 | 6/1998 |
| DE | 10033834 B4 | 6/2001 |
| EP | 0989320 A2 * | 3/2000 |
| JP | H02-011935 A | 1/1990 |
| JP | H08-284983 A | 11/1996 |
| JP | H08-511081 A | 11/1996 |
| JP | 2002-372082 A | 12/2002 |
| KR | 2014-0066307 A | 6/2014 |

OTHER PUBLICATIONS

International Search Report dated Feb. 19, 2019 for PCT/JP2018/043051.
International Search Report/Written Opinion dated Feb. 19, 2019 for PCT/JP2018/043051.
CN Office Action dated Apr. 8, 2021 in Chinese Application No. 201880075231.5 (with attached English-language translation).

* cited by examiner

FLOATING DISC BRAKE AND METHOD FOR ASSEMBLING SAME

TECHNICAL FIELD

The present invention relates to a floating disc brake for braking a vehicle.

BACKGROUND ART

FIG. 12 shows a floating disc brake having a structure in the related art described in Japanese Patent Publication No. 2002-372082 A. A floating disc brake 1 includes a support 2, a yoke (caliper) 3, an inner pad 4, and an outer pad 5.

The support 2 is fixed to a suspension device such as a knuckle that constitutes a vehicle body in a state of being adjacent to an axially inner side of a rotor 6 that rotates together with a wheel. Throughout the present specification and the claims, terms "axially", "radially" and "circumferentially" refer to axial, radial, and circumferential directions of the rotor unless otherwise specified.

The yoke 3 includes a bifurcated claw portion 7 on the axially outer side and a cylinder portion 8 on the axially inner side. The yoke 3 is supported to the support 2 in an axially movable manner. For this purpose, in the illustrated example, a pair of slide pins 9 are inserted into a pair of slide holes 10 provided in the support 2. Each of the pair of slide pins 9 has a base end portion supported and fixed to the yoke 3.

The inner pad 4 is provided on the axially inner side relative to the rotor 6 and is supported to the support 2 in an axially movable manner. In contrast, the outer pad 5 is provided on the axially outer side relative to the rotor 6 and is supported to an axially inner side of the claw portion 7 constituting the yoke 3. Therefore, two circumferential side portions of a substantially V-shaped pad spring 11 fixed to an axially outer surface (back surface) of the outer pad 5 are elastically engaged with the claw portion 7 from the axially outer side. A pair of protrusions (dowels) 12 formed on the axially outer surface of the outer pad 5 are respectively fitted into a pair of reception holes (dowel holes) 13 formed in an axially inner surface of the claw portion 7.

When braking is performed, pressure oil is fed into the cylinder portion 8 and the inner pad 4 is pressed downward from above in FIG. 12 against an axially inner surface of the rotor 6 by a piston (not shown). As a reaction of the pressing force, the yoke 3 moves upward in FIG. 12 based on the sliding between the slide pins 9 and the slide holes 10, while the outer pad 5 is pressed against an axially outer surface of the rotor 6 by the claw portion 7. As a result, the rotor 6 is strongly clamped from two axial sides so that braking is performed.

CITATION LIST

Patent Literature

Patent Literature 1: JP-A-2002-372082

SUMMARY OF INVENTION

Technical Problem

In the floating disc brake 1 having the structure in the related art, the outer pad 5 is supported directly to the yoke 3 without being supported to the support 2. This is advantageous to reduce the size and weight of the support 2.

However, in the floating disc brake 1 having the structure in the related art, in order to support the outer pad 5 to the yoke 3, two circumferential side portions of the pad spring 11 are elastically engaged with the claw portion 7 from the axially outer side. This may lead to a problem to be solved as follows. First, the outer pad 5 is assembled such that the outer pad 5 is brought close to the claw portion 7 from the radially inner side and the claw portion 7 is pressed between the axially outer surface of the outer pad 5 and the circumferential side portions of the pad spring 11. At this time, two circumferential side portions of the pad spring 11 pull the axially outer surface of the claw portion 7 and accordingly, a large force is required for pressing the outer pad 5. This lowers the workability of assembling the outer pad 5. Further, two circumferential side portions of the pad spring 11 cover a part of the axially outer surface of the claw portion 7, which lowers the degree of freedom regarding the design of the floating disc brake 1.

Further, the outer pad 5 is held to the claw portion 7 even before the protrusions 12 are fitted into the reception holes 13 (before assembly to a normal position) and accordingly, the operator may misidentify that the assembly is completed.

The present invention is made in view of the above circumstances and an object thereof is to implement a structure capable of improving the workability of assembling an outer pad to a yoke. The present invention also provides a structure capable of improving the degree of freedom regarding the design of a floating disc brake.

Solution to Problem

The object of the present invention is achieved by a floating disc brake having the following configurations.

(1) A floating disc brake includes:

a support that is fixed to a vehicle body and is adjacent to a rotor that rotates together with a wheel;

an inner pad provided on an axially inner side relative to the rotor;

an outer pad provided on an axially outer side relative to the rotor; and a yoke supported to the support in an axially movable manner, the yoke including a pad support portion that supports the outer pad on an axially outer side of the outer pad.

The outer pad includes, on its axially outer surface, a pair of pad-side engagement portions formed of an elastic material.

The pad support portion has a support hole that is open on at least an axially inner surface of the pad support portion, and the support hole is provided with a pair of yoke-side engagement portions on inner side surfaces of the support hole that face each other in a circumferential direction.

The pair of pad-side engagement portions and the pair of yoke-side engagement portions are concavo-convex engaged with each other in the circumferential direction.

(2) In the floating disc brake according to (1), the support hole is open on a radially inner surface of the pad support portion.

(3) In the floating disc brake according to (1) or (2), the support hole is a bottomed hole that is not open on an axially outer surface of the pad support portion.

(4) In the floating disc brake according to (1) or (2), the support hole is a through hole that is also open on an axially outer surface of the pad support portion.

(5) In the floating disc brake according to any one of (1) to (4), the pair of pad-side engagement portions are housed inside the support hole without protruding outward from the support hole.

(6) In the floating disc brake according to any one of (1) to (5), the support hole is provided with, on its two circumferential side portions of axially inner opening edge portions, a pair of guide surface portions that are close to each other in the circumferential direction as approaching an axially outer side.

(7) In the floating disc brake according to any one of (1) to (6), each of the pair of pad-side engagement portions is a convex portion protruding toward a circumferentially outer side, and each of the pair of yoke-side engagement portions is a concave portion recessed toward the circumferentially outer side.

Alternatively, each of the pair of pad-side engagement portions is a concave portion recessed toward a circumferentially outer side, while each of the pair of yoke-side engagement portions is a convex portion protruding toward the circumferentially outer side.

(8) In the floating disc brake according to (7), an axially inner surface of each of the pair of pad-side engagement portions that is a convex portion and a surface facing an axially outer side of each of the pair of yoke-side engagement portions that is a concave portion are elastically abutted against each other, so that a force toward a circumferentially inner side is applied to the pair of pad-side engagement portions.

(9) In the floating disc brake according to (7) or (8), the pair of pad-side engagement portions of a pad spring that is a leaf spring are provided on two circumferentially outer sides of a base plate portion fixed to the axially outer surface of the outer pad, and each of the pair of pad-side engagement portions includes a standing portion bent toward an axially outer side from a circumferentially outer end portion of the base plate portion, an overhang portion bent toward the circumferentially outer side from an axially outer end portion of the standing portion, and a turned-back portion folded toward an axially inner side and a circumferentially inner side from a circumstantially outer end portion of the overhang portion.

(10) In the floating disc brake according to (9), a continuous portion between the base plated portion and the standing portion, a continuous portion between the standing portion and the overhang portion, and a continuous portion between the overhang portion and the turned-back portion are each formed of a bent portion bent in an arc shape.

(11) In the floating disc brake according to (10), a radius of curvature of a bent portion constituting the continuous portion between the base plate portion and the standing portion is larger than a radius of curvature of a bent portion constituting the continuous portion between the standing portion and the overhang portion, and is larger than a radius of curvature of a bent portion constituting the continuous portion between the overhang portion and the turned-back portion.

(12) In the floating disc brake according to any one of (1) to (11), the outer pad includes a pair of protrusions on two circumferentially outer sides relative to the pair of pad-side engagement portions on the axially outer surface, and the pair of protrusions protrude in an axial direction.

The pair of protrusions are inserted respectively into a pair of reception holes (dowel holes) provided on two circumferentially outer sides relative to the support hole in the axially inner surface of the pad support portion.

(13) In the floating disc brake according to (12), the pad support portion has, on the axially inner surface, a guide groove recessed in the axial direction at portions aligned with the reception holes in the circumferential direction in radially inner portions relative to the reception holes.

(14) In the floating disc brake according to (13), a bottom surface of the guide groove is inclined toward an axially inner side as approaching the reception holes in a radial direction.

(15) In a method of assembling the floating disc brake according to (1), the outer pad is brought close to the pad support portion from an axially inner side and the pair of pad-side engagement portions are pressed against an axially inner opening edge portions of the support hole so that the pair of pad-side engagement portions are elastically deformed to a circumferentially inner side, the pair of pad-side engagement portions enter the support hole in an axial direction and are elastically restored at positions facing the pair of yoke-side engagement portions in the circumferential direction, so that the pair of pad-side engagement portions and the pair of yoke-side engagement portions are concavo-convex engaged with each other in the circumferential direction.

(16) In a method of assembling the floating disc brake according to (2), the outer pad is brought close to the pad support portion from a radially inner side and the pair of pad-side engagement portions proceed in a radial direction from an opening of the support hole that is open on a radially inner surface of the pad support portion, so that the pair of pad-side engagement portions and the pair of yoke-side engagement portions are concavo-convex engaged with each other in the circumferential direction.

Advantageous Effects of Invention

According to the present invention having the above-described configurations, the workability of assembling the outer pad to the yoke can be improved. According to the present invention, the degree of freedom regarding the design of the floating disc brake can also be improved.

DESCRIPTION OF EMBODIMENTS

First Embodiment

Figure 1:
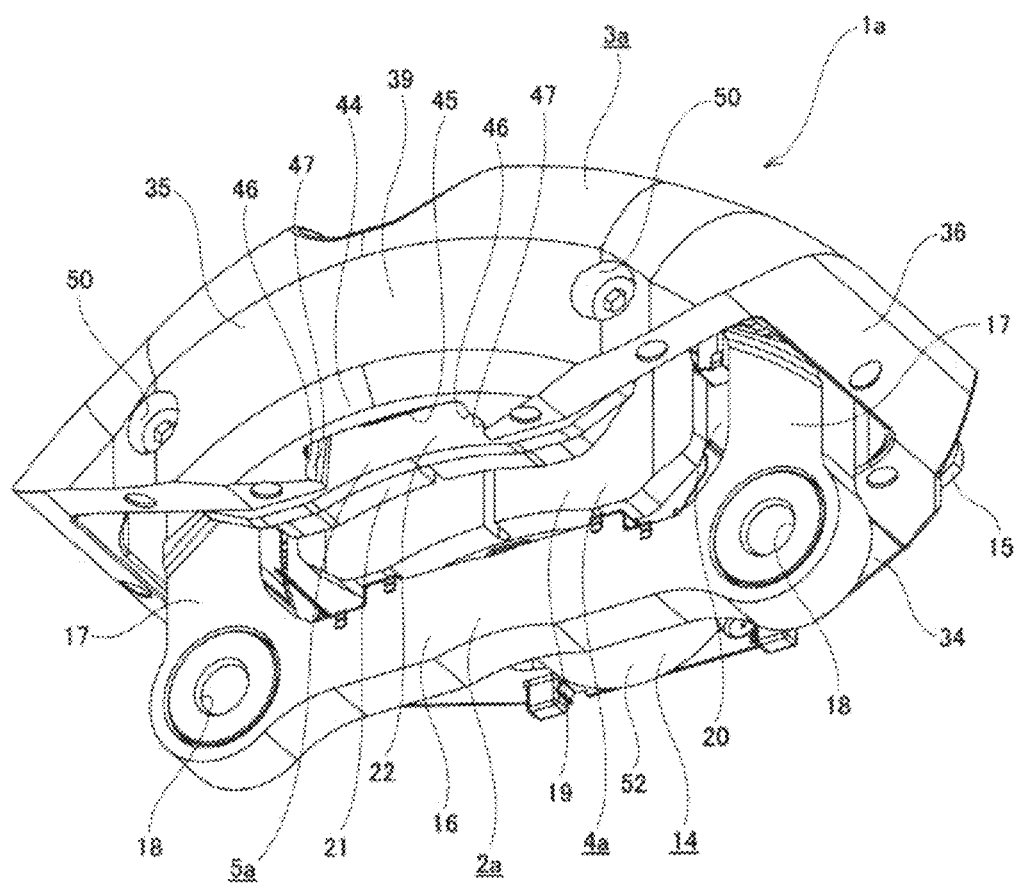
FIG. 1 is a perspective view of a floating disc brake according to a first embodiment of the present invention.
Figure 2:
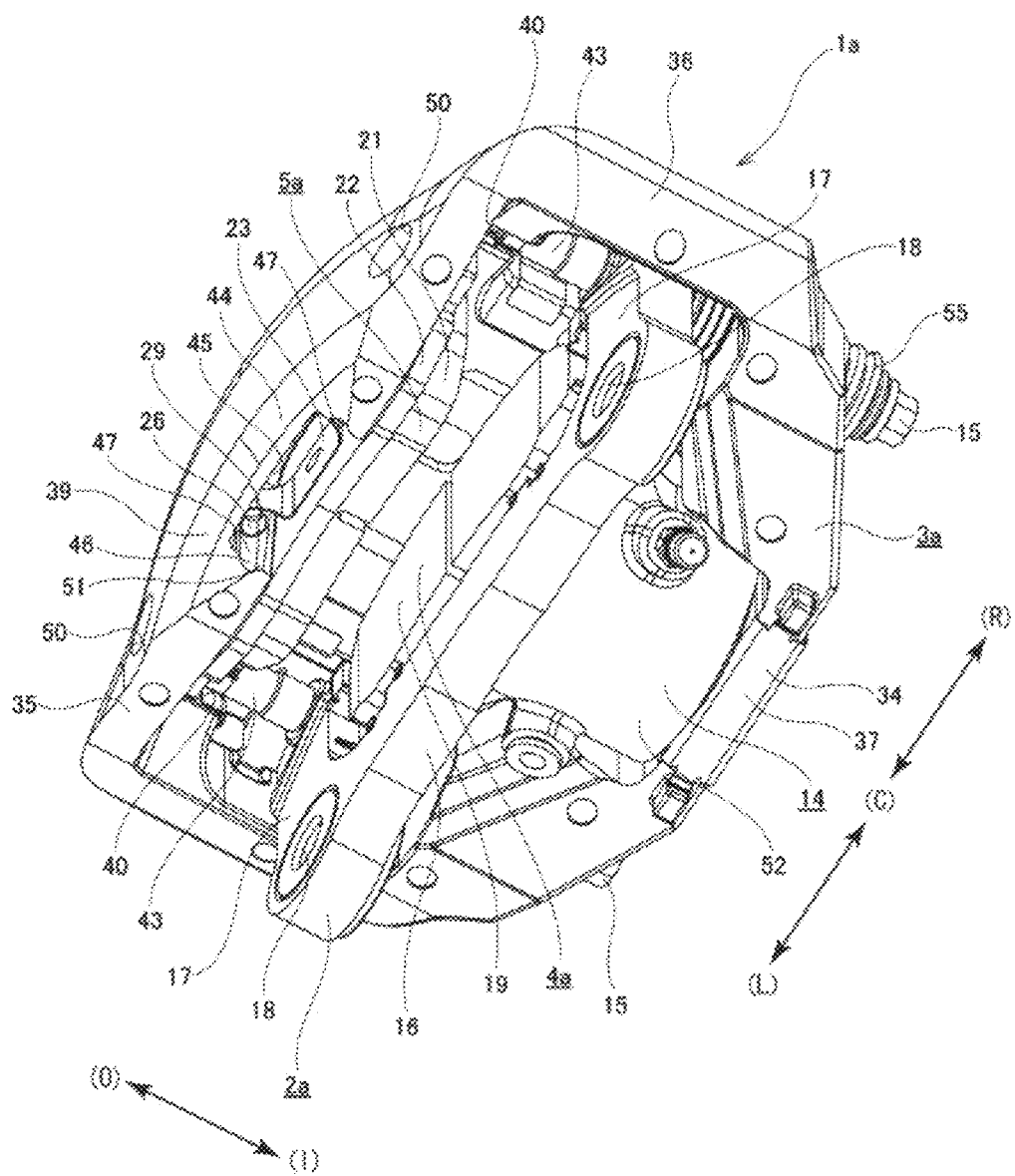
FIG. 2 is a perspective view of the floating disc brake according to the first embodiment of the present invention as viewed from an angle different from that of FIG. 1.
Figure 3:
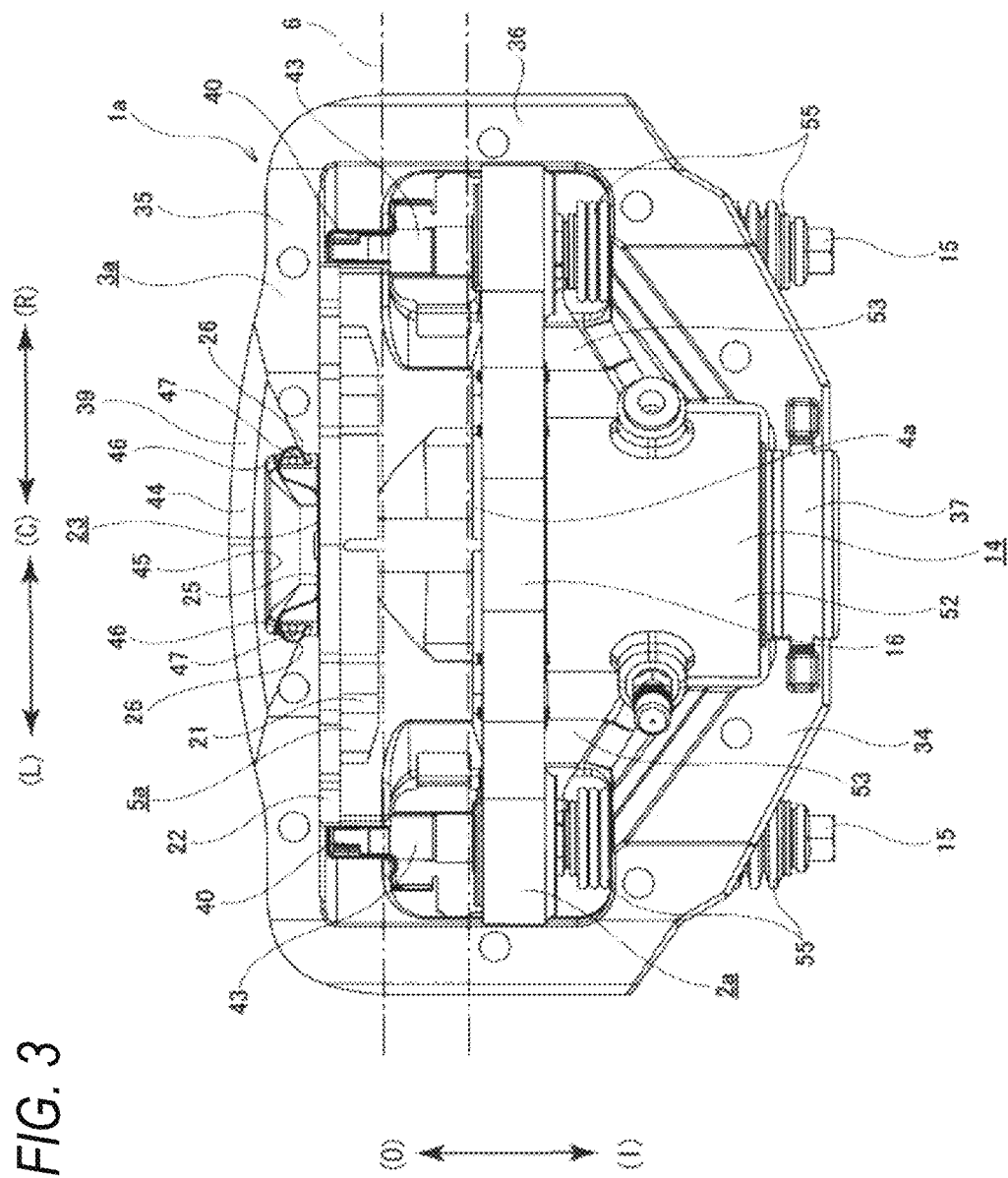
FIG. 3 shows the floating disc brake according to the first embodiment of the present invention as viewed from the radially inner side.
Figure 4:
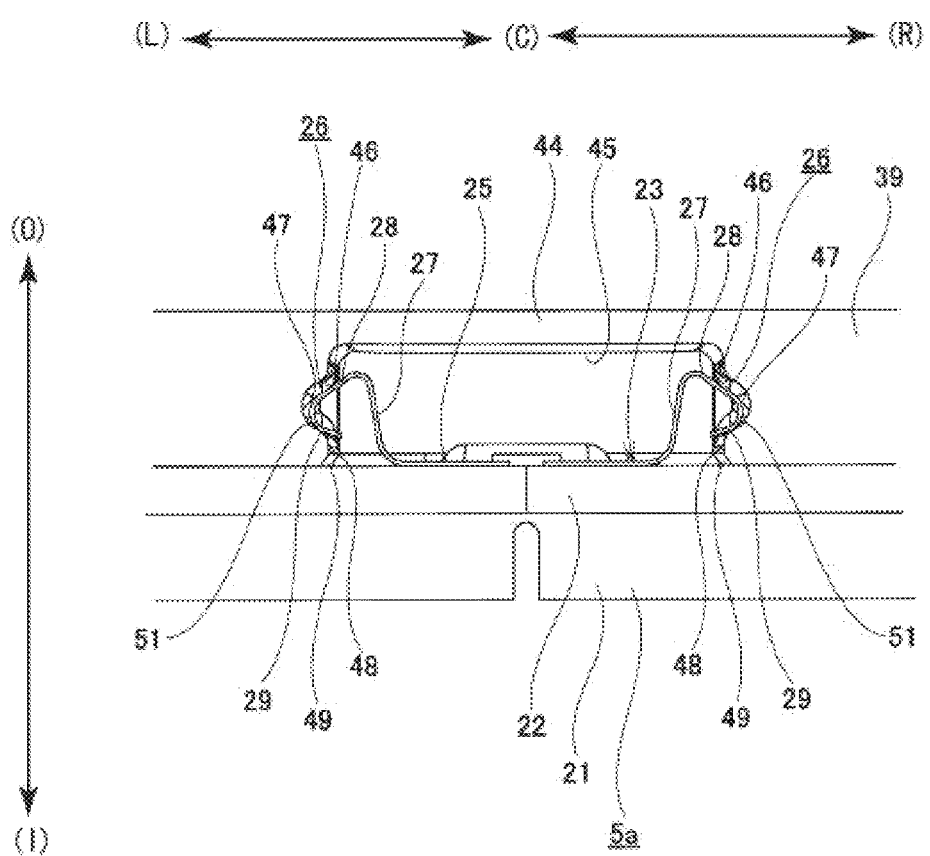
FIG. 4 shows an enlarged view of a part in FIG. 3.

The first embodiment of the present invention will be described with reference to FIGS. 1 to 8.

A floating disc brake 1a according to the first embodiment is used for braking an automobile and includes a support 2a, a yoke 3a, an inner pad 4a, an outer pad 5a, a cylinder 14, and a pair of support pins 15. With the pair of support pins 15, the yoke 3a is supported to the support 2a in an axially movable manner and the cylinder 14 is supported to the support 2a in an axially non-movable manner.

In the structure in the related art, the cylinder portion 8 is integrated with the yoke 3; in the structure according to the first embodiment, the yoke 3a and the cylinder 14 are separated from each other.

The support 2a, which is formed of metal, is provided on the axially inner side (I) relative to the rotor 6 that rotates together with a wheel, and is fixed to a suspension device such as a knuckle that constitutes a vehicle body. The support 2a has a substantially U shape in a front view and includes a base portion 16 provided on the radially inner side and extending in the circumferential direction, and a pair of arm portions 17 extending toward the radially outer side from two circumferential end portions of the base portion 16. Two circumferential side portions of the base portion 16 are each formed with an attachment hole 18 to fix the support 2a to the suspension device such as a knuckle. Two top end portions of the arm portions 17 are each formed with a through hole through which the support pins 15 are inserted. The arm portions 17 each include, on a circumferentially inner surface, a torque receiving portion to support a torque acting on the inner pad 4a at the time of braking.

Regarding members constituting the floating disc brake 1a, the circumferentially inner side (C) refers to the circumferentially middle side of the floating disc brake 1a when the floating disc brake 1a is assembled, and circumferentially outer sides (L), (R) refer to two circumferential sides of the floating disc brake 1a when the floating disc brake 1a is assembled.

The inner pad 4a is provided on the axially inner side (I) relative to the rotor 6 and includes a lining (friction material) 19 and a metal back plate (pressure plate) 20 supporting a back surface of the lining 19. By being provided on the radially outer side relative to the base portion 16 as well as on the circumferentially inner side relative to the pair of arm portions 17, the inner pad 4a is supported to the support 2a in an axially movable and radial and circumferential movement-restricted manner.

Figure 5:
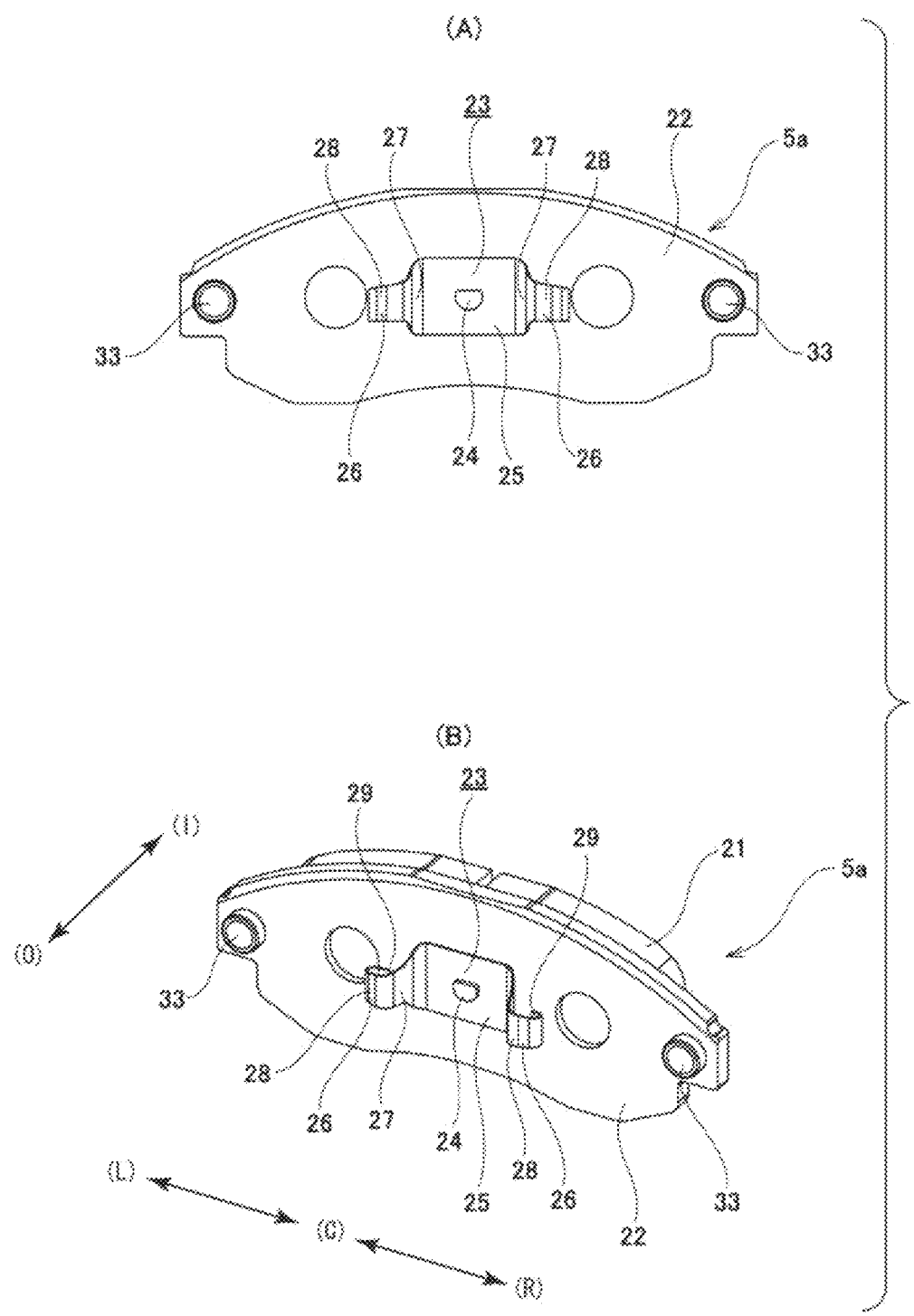
FIG. 5 shows an outer pad used in the first embodiment of the present invention when the outer pad is taken out, in which (A) is a front view as viewed from the axially outer side and (B) is a perspective view.

The outer pad 5a is provided on the axially outer side (O) relative to the rotor 6 and includes a lining (friction material) 21 and a metal back plate (pressure plate) 22 supporting a back surface of the lining 21. As shown in FIG. 5, a pad spring 23 is supported and fixed to an axially outer surface of the back plate 22 constituting the outer pad 5a. The pad spring 23 is formed of a leaf spring and used to support the outer pad 5a to the support 2a.

The pad spring 23 is formed by punching and bending a metal plate having elasticity such as a stainless steel plate. The pad spring 23 includes a rectangular plate-shaped base plate portion 25 and a pair of pad-side engagement portions 26 provided on two circumferentially outer sides of the base plate portion 25. The base plate portion 25 is fixed to the axially outer surface of the back plate 22 by a crimping portion 24.

Figure 6:
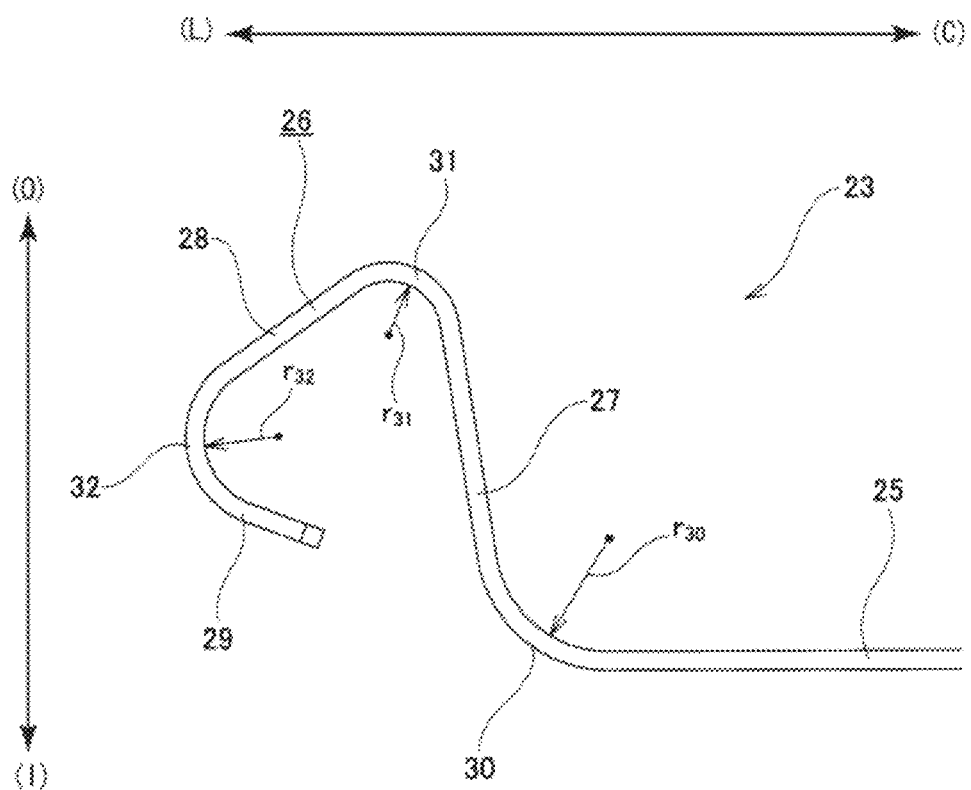
FIG. 6 is an enlarged view of a part of a pad spring used in the first embodiment of the present invention.

As shown in FIG. 6, the pad-side engagement portions 26 include standing portions 27, overhang portions 28, and turned-back portions 29, respectively. The standing portions 27 are bent toward the axially outer side (O) from circumferentially outer end portions of the base plate portion 25. The overhang portions 28 are bent respectively toward the circumferentially outer sides (L), (R) from axially outer end portions of the standing portions 27. The turned-back portions 29 are folded toward the axially inner side (I) and the circumferentially inner side (C) from circumferentially outer end portions of the overhang portions 28. Therefore, the pad-side engagement portions 26 in the first embodiment have a convex shape of protruding toward the circumferentially outer sides (L), (R), respectively.

A continuous portion between the base plate portion 25 and the standing portion 27 is formed of a first bent portion 30 that is bent in an arc shape. A continuous portion between the standing portion 27 and the overhang portion 28 is formed of a second bent portion 31 that is bent in an arc shape. A continuous portion between the overhang portion 28 and the turned-back portion 29 is formed of a third bent portion 32 that is bent in an arc shape. A radius of curvature $r_{30}$ of the first bent portion 30 is larger than a radius of curvature $r_{31}$ of the second bent portion 31 and larger than a radius of curvature $r_{32}$ of the third bent portion 32 ($r_{30} > r_{31}$, $r_{32}$).

The back plate 22 includes a pair of protrusions (dowels) 33 on the axially outer surface. Each of the protrusions 33 has a substantially cylindrical shape and protrudes toward the axially outer side (O) from the axially outer surface of the back plate 22. The pair of protrusions 33 are provided on two circumferentially outer sides (L), (R) relative to the pad spring 23 at two circumferentially outer end portions of the back plate 22.

The yoke 3a is formed of metal or non-metal and covers the support 2a, the inner pad 4a, the outer pad 5a, and the cylinder 14 from the radially outer side. The yoke 3a includes an inner body 34 provided on the axially inner side (I), an outer body 35 provided on the axially outer side (O), and a bridge portion 36 provided on the radially outer side relative to the rotor 6. The bridge portion 36 axially connects the inner body 34 and the outer body 35.

The inner body 34 includes, at a circumferentially middle portion, a pressed portion 37 pressed by a second piston (not shown) fitted in the cylinder 14. The inner body 34 has pin insertion holes 38 on radially outer portions of two circumferential side portions. The support pins 15 are inserted through the pin insertion holes 38.

The outer body 35 includes a pad support portion 39 at a portion located on the axially outer side (O) relative to the outer pad 5a. The pad support portion 39 has a substantial fan shape in a front view. The outer body 35 includes pin receiving portions 40 at portions on the radially outer side relative to the outer pad 5a. Cap nuts 43 screwed to top end portions (axially outer end portions) of the support pins 15 are slidably fitted in the pin receiving portions 40 in the axial direction.

Particularly in the first embodiment, the pad support portion 39 constituting the outer body 35 has a support hole 45 that is a bottomed hole at a circumferentially middle portion. The support hole 45 has a bottom portion 44, opens only on an axially inner surface and a radially inner surface of the pad support portion 39 and does not open on an axially outer surface. The support hole 45 has a substantially rectangular shape in a front view and is provided with a pair of yoke-side engagement portions 47 at axially middle portions of inner side surfaces 46 facing each other in the circumferential direction. The yoke-side engagement portions 47 are concave portions recessed respectively toward the circumferentially outer sides (L), (R). The yoke-side engagement portions 47 have a concave arc-shaped cross section and a size enough for top half portions (circumferentially outer half portions) of the pad-side engagement portions 26 to enter. The inner side surfaces 46 constituting the support hole 45 are provided with curved surface portions 48 having a convex arc shape on the axially inner side (opening side) relative to the yoke-side engagement portions 47. The support hole 45 is provided with a pair of guide surface portions 49 at two circumferentially side portions of axially inner opening edge portions. The guide surface portions 49 are inclined toward each other in the circumferential direction as approaching the axially outer side (O) (approaching the bottom portion 44). In other words, the guide surface portions 49, the curved surface portions 48, and the yoke-side engagement portions 47 are provided in order from the opening side on the inner side surfaces 46 of the support hole 45. The guide surface portions 49, the curved surface portions 48, and the yoke-side engagement portions 47 are smoothly connected to each other in the axial direction. A distance between the pair of inner side surfaces 46 constituting the support hole 45 decreases as approaching the radially outer side.

Further, the pad support portion 39 has a pair of reception holes (dowel holes) 50 on the axially inner surface. The reception holes 50 are circular through holes. The pair of reception holes 50 are provided at two circumferentially outer portions of the pad support portion 39 on two circumferentially outer sides relative to the support hole 45. An inner diameter of the reception holes 50 is slightly larger than an outer diameter of the protrusions 33.

In the first embodiment, the outer pad 5a is supported using the pad spring 23 to the axially inner side (I) of the pad support portion 39 having the above configurations. Specifically, the pair of pad-side engagement portions 26 constituting the pad spring 23 are respectively concavo-convex engaged with the pair of yoke-side engagement portions 47 formed in the support hole 45 in the circumferential direction, so that the outer pad 5a is supported on the axially inner side (I) of the pad support portion 39. In this state, the pair of protrusions 33 provided on the axially outer surface of the outer pad 5a are inserted (fitted) into the pair of reception holes 50 formed in the axially inner surface of the pad support portion 39. With the engagement between the pad-side engagement portions 26 and the yoke-side engagement portions 47, the outer pad 5a is prevented from falling off from the pad support portion 39 to the axially inner side (I), and is restricted from moving in the circumferential and radial directions relative to the pad support portion 39 by inserting the protrusions 33 into the reception holes 50.

When the pad-side engagement portions 26 and the yoke-side engagement portions 47 are concavo-convex engaged with each other to support the outer pad 5a on the axially inner side (I) of the pad support portion 39, the whole pad spring 23 is housed inside the support hole 45. That is, the pad spring 23 does not protrude outward from the support hole 45.

When the pad-side engagement portions 26 and the yoke-side engagement portions 47 are concavo-convex engaged with each other, axially inner surfaces of the turned-back portions 29 constituting the pad-side engagement portions 26 are elastically abutted against abutment surfaces 51 of the yoke-side engagement portions 47. The abutment surfaces 51 face the axially outer side (O). The turned-back portions 29 and the abutment surfaces 51 are inclined toward the circumferentially outer sides (L), (R) as approaching the axially outer side (O). For this reason, an elastic force toward the circumferentially inner side (C) is separately applied to the pair of pad-side engagement portions 26 with the abutment between the axially inner surfaces of the turned-back portions 29 and the abutment surfaces 51. Therefore, when the pad-side engagement portions 26 are concavo-convex engaged with the yoke-side engagement portions 47, the pad-side engagement portions 26 are slightly bent and deformed toward the circumferentially inner side (C) as compared with a free state.

Figure 7:
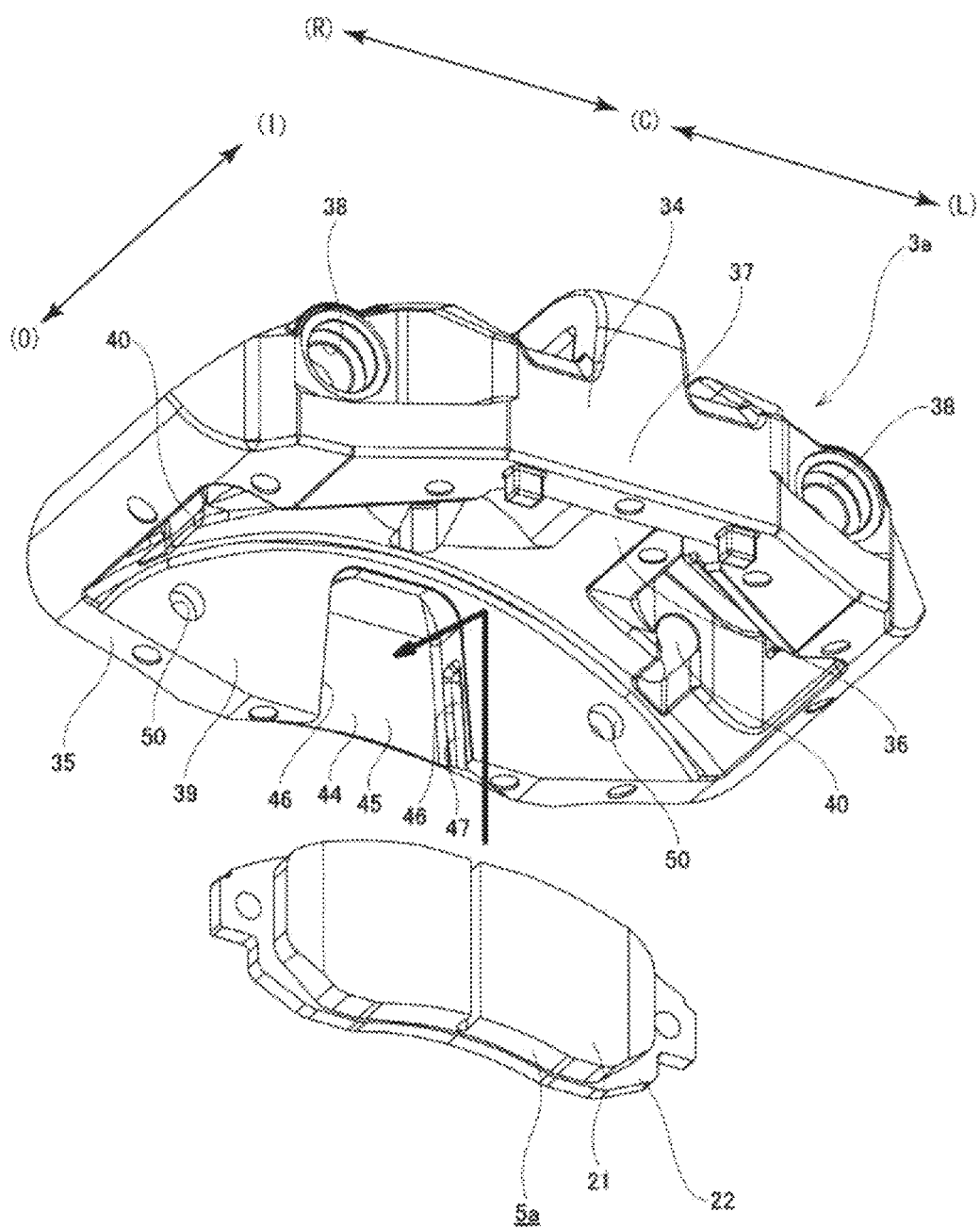
FIG. 7 is a perspective view of the outer pad and a yoke according to the first embodiment of the present invention when the outer pad and the yoke are taken out.
Figure 8:
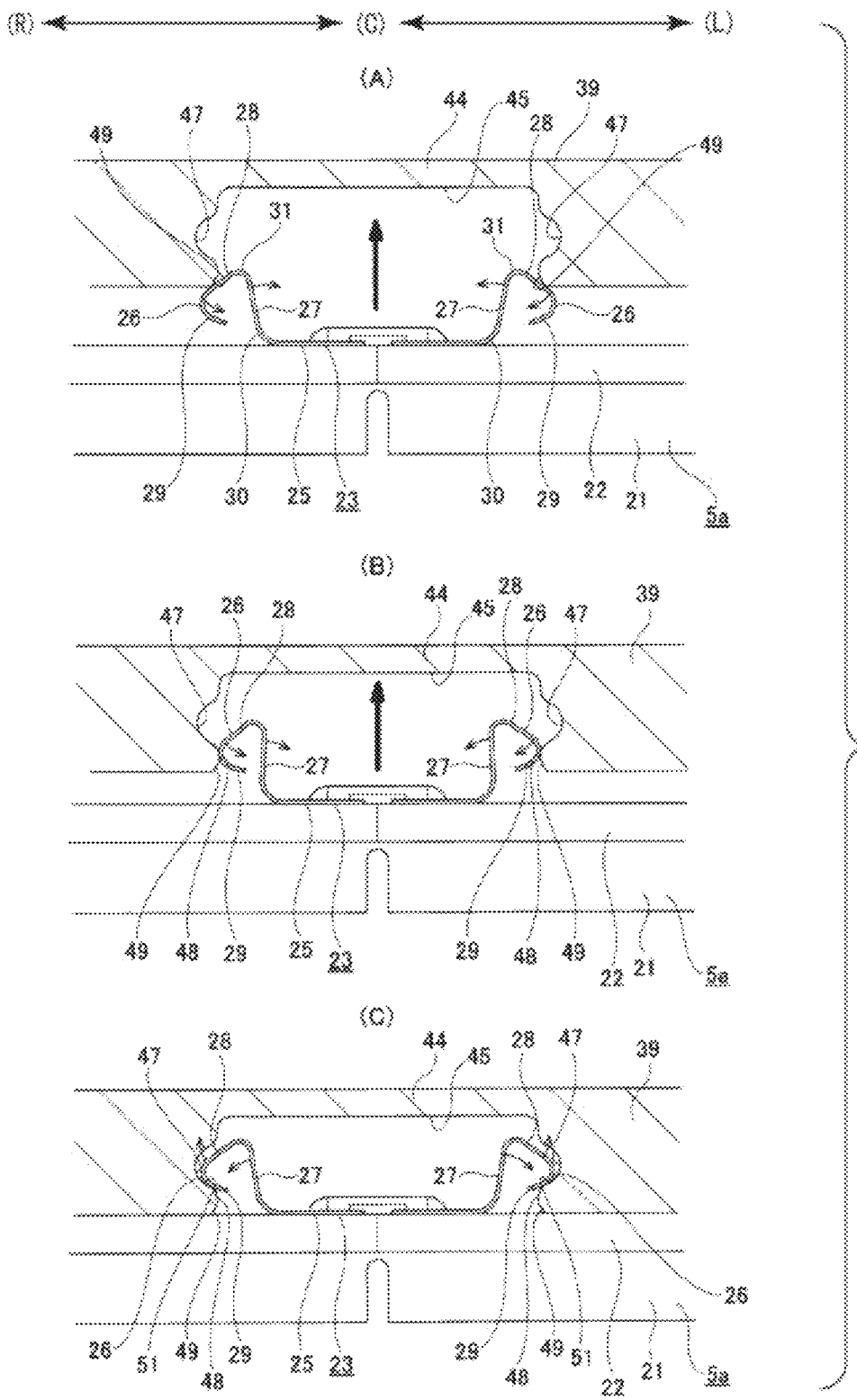
FIG. 8 shows a method of attaching the outer pad in order according to the first embodiment of the present invention.

Here, a method of assembling the outer pad 5a to the pad support portion 39 will be described with reference to FIGS. 7 and 8. First, the outer pad 5a is provided on the axially inner side (I) relative to the pad support portion 39, and the pair of protrusions 33 (see FIG. 5) provided on the axially outer surface of the outer pad 5a are axially opposite to the pair of reception holes 50 formed in the axially inner surface of the pad support portion 39. Next, the outer pad 5a is brought close to the pad support portion 39 from the axially inner side (I). As shown in (A) of FIG. 8, top end portions of the pair of protrusions 33 are inserted into the pair of reception holes 50, respectively, and the axially outer surfaces of the overhang portions 28 constituting the pair of pad-side engagement portions 26 are respectively pressed against the guide surface portions 49 formed at the axially inner opening edge portions of the support hole 45. Accordingly, the overhang portions 28 are guided by the guide surface portions 49, the standing portions 27 are elastically deformed to the circumferentially inner side (C) with the first bent portion 30 as a starting point, and the overhang portions 28 are elastically deformed to the circumferentially inner side (C) with the second bent portion 31 as a starting point. Then, as shown in (B) of FIG. 8, the pair of pad-side engagement portions 26 are inserted into the support hole 45 in the axial direction in a state in which a distance between top end portions of the pair of pad-side engagement portions 26 is smaller than the opening of the support hole 45. Then, as shown in (C) of FIG. 8, the third bent portion 32 constituting the pad-side engagement portions 26 climbs over the curved surface portions 48 constituting the inner side surfaces 46 of the support hole 45, and the pair of pad-side engagement portions 26 (the standing portions 27 and the overhang portions 28) are elastically restored at positions where the pair of pad-side engagement portions 26 and the pair of yoke-side engagement portions 47 face each other in the circumferential direction. Accordingly, the pair of pad-side engagement portions 26 and the pair of yoke-side engagement portions 47 are concavo-convex engaged with each other in the circumferential direction. At this time, the axially inner surfaces of the turned-back portions 29 constituting the pad-side engagement portions 26 are elastically abutted against the abutment surfaces 51 constituting the yoke-side engagement portions 47. In the first embodiment, the outer pad 5a is assembled to the axially inner side (I) of the pad support portion 39 by the above-described method.

The cylinder 14 includes a substantially cylindrical cylinder body 52 and a pair of attachment flanges 53 protruding toward two circumferentially outer sides from an outer peripheral surface of the cylinder body 52. An internal space of the cylinder body 52 is open on two axial sides and a first piston and the second piston (not shown) are fitted to be axially movable. A top end portion of the first piston faces the axially inner surface of the inner pad 4a, and a top end portion of the second piston faces the axially outer surface of the pressed portion 37 constituting the inner body 34. In the internal space of the cylinder body 52, a part between the first piston and the second piston is referred to as a hydraulic chamber to introduce pressure oil. The attachment flanges 53 are formed with attachment holes penetrating in the axial direction.

The yoke 3a and the cylinder 14 are supported on the support 2a using the pair of support pins 15. Specifically, the support pins 15 are inserted sequentially into the pin insertion holes 38 provided in the inner body 34, the attachment holes provided in the attachment flanges 53, and the through holes provided in the support 2a in a state in which sleeves (not shown) around base half portions of the support pins 15 are externally fitted. Then, the cap nuts 43 are screwed to the top end portions of the support pins 15 axially protruding from the support 2a. Accordingly, the pair of support pins 15 and the cap nuts 43 are supported and fixed to the support 2a. With the sleeves being sandwiched between base portions (head portions) of the support pins 15 and the attachment flanges 53, the cylinder 14 is supported to the support 2a in an axially non-movable manner. The sleeves are slidable inside the pin insertion holes 38 and the cap nuts 43 are slidable inside the pin receiving portions 40, so that the yoke 3a is supported to the support 2a in an axially movable manner. In the illustrated example, a part of the sleeves protruding toward two axial sides of the pin insertion holes 38 is covered by a boot 55.

In order to perform braking by the floating disc brake 1a according to the first embodiment, pressure oil is introduced into the hydraulic chamber in the cylinder 14. Accordingly, the first piston and the second piston are respectively moved away from each other in the axial direction. Then, the inner pad 4a is pressed upward from below in FIG. 3 against the axially inner surface of the rotor 6 by the first piston. At the same time, the pressed portion 37 of the inner body 34 is pressed downward from above in FIG. 3 by the second piston, and the yoke 3a is moved downward in FIG. 3 relative to the support 2a. Thus, the outer pad 5a is pressed downward from above in FIG. 3 against the axially outer surface of the rotor 6 via the pad support portion 39 of the outer body 35. As a result, the rotor 6 is strongly clamped from two axial sides so that braking is performed. A torque acting on the inner pad 4a at the time of braking is directly supported by the support 2a, whereas a torque acting on the outer pad 5a is transmitted to the yoke 3a through an abutment portion between the protrusions 33 and the reception holes 50, and is then supported by the support 2a via the pair of support pins 15.

When braking is released, pressure oil is discharged from the hydraulic chamber of the cylinder 14. Accordingly, the first piston is pulled back into the internal space of the cylinder body 52 by an elastic force of a seal member provided around the first piston. Similarly, the second piston is also pulled back into the internal space of the cylinder body 52 by an elastic force of a seal member provided around the second piston.

According to the floating disc brake 1a in the first embodiment having the above configurations, the workability of assembling the outer pad 5a to the yoke 3a can be improved.

That is, when the outer pad 5a is assembled in the first embodiment, the pair of pad-side engagement portions 26 constituting the pad spring 23 fixed to the axially outer surface of the outer pad 5a are respectively concavo-convex engaged with the pair of yoke-side engagement portions 47 formed on the inner side surfaces 46 of the support hole 45 in the circumferential direction. With the outer pad 5a being brought close to the pad support portion 39 from the axially inner side (I) and being pressed into the support hole 45 while the pair of pad-side engagement portions 26 are bent and deformed, operation of assembling the outer pad 5a is facilitated. For this reason, no large force is necessary for the operation of assembling the outer pad since two circumferential side portions of the pad spring are not pulled as the structure in the related art does. Therefore, in the first embodiment, the workability of assembling the outer pad 5a to the yoke 3a can be improved. Further, since the guide surface portions 49 are provided at the axially inner opening edge portions of the support hole 45, the pair of pad-side engagement portions 26 can also be easily pressed (bent) into the support hole 45.

In the first embodiment, since the pair of pad-side engagement portions 26 are pressed into the support hole 45 while being bent and deformed, the axially inner surfaces of the turned-back portions 29 abut against the abutment surfaces 51 constituting the yoke-side engagement portions 47 with a certain degree of force when the pair of pad-side engagement portions 26 are elastically restored. For this reason, a worker who performs the assembling work of the outer pad 5a can easily know that the assembling work of the outer pad 5a is completed by sensation (click feeling) of a finger pressing the outer pad 5a and sound (snapping sound) generated accompanying the abutment. Therefore, it is possible to effectively prevent the worker from misidentifying that the assembling work is completed.

Further, since an axially outer surface of the outer body 35 is not covered by the pad spring 23, the degree of freedom regarding the design of the floating disc brake 1a can be improved. In the first embodiment, since the support hole 45 has a bottom, a wide design surface can be ensured on the axially outer surface of the outer body 35. Since the whole pad spring 23 is housed inside the support hole 45, the design can also be improved from this aspect.

Further, when the outer pad 5a is assembled, an elastic force toward the circumferentially inner side (C) can be applied to the pair of pad-side engagement portions 26 based on the abutment between the axially inner surface of the turned-back portions 29 and the abutment surfaces 51. Therefore, it is possible for the outer pad 5a to have a centering function (a function of automatically returning to a neutral position). Since the continuous portion between the base plate portion 25 and the standing portion 27, the continuous portion between the standing portion 27 and the overhang portion 28, and the continuous portion between the overhang portion 28 and the turned-back portion 29 of the pad spring 23 are formed of arc-shaped bent portions, an attachment feeling (click feeling) when the outer pad 5a is attached can be ensured.

Second Embodiment

Figure 9:
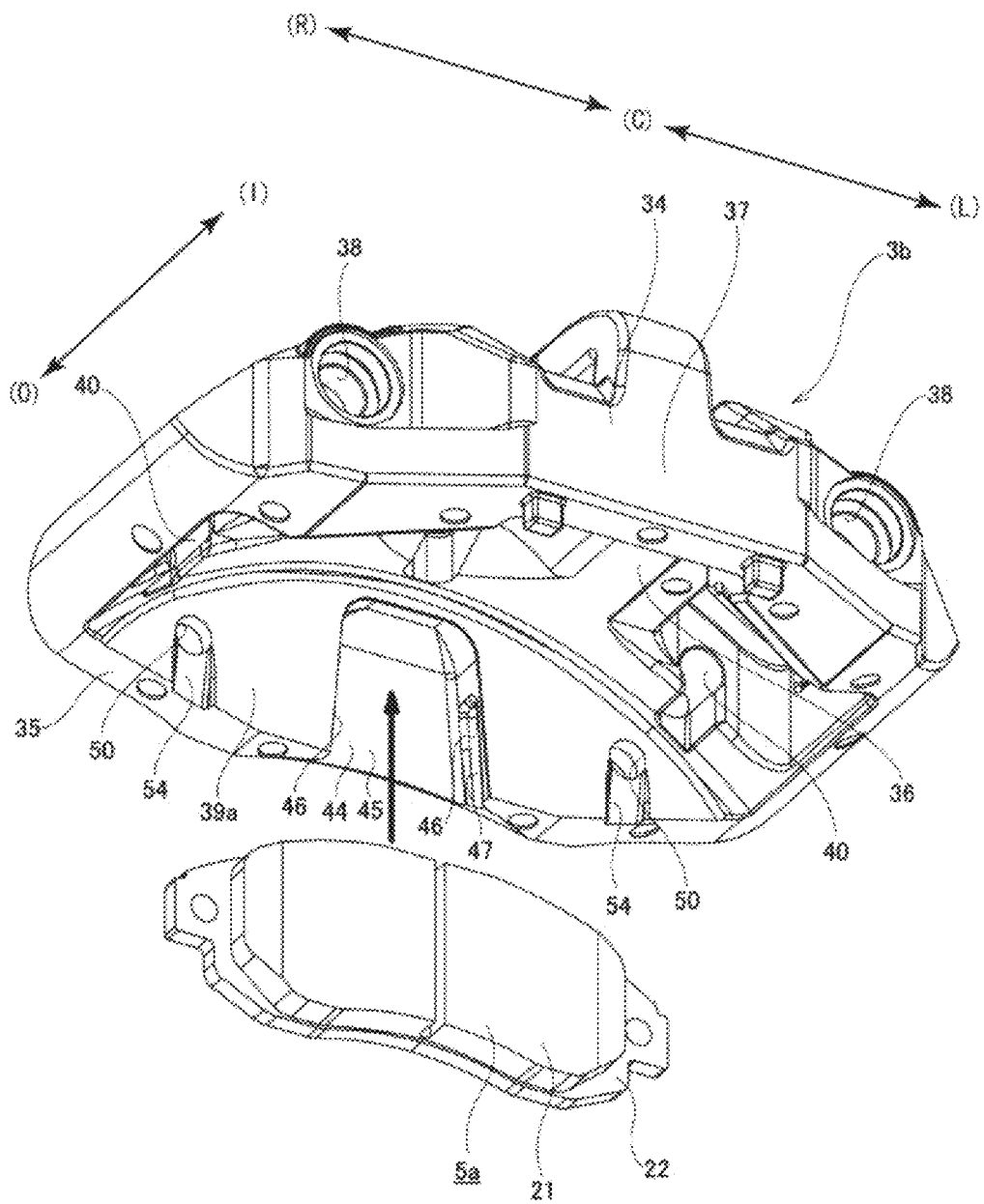
FIG. 9 shows a second embodiment of the present invention and corresponds to FIG. 7.

The second embodiment will be described with reference to FIG. 9. A structure in the second embodiment is the same as the structure in the first embodiment except a structure of an axially inner surface of a pad support portion 39a constituting a yoke 3b. That is, in the second embodiment, the axially inner surface of the pad support portion 39a is formed with guide grooves 54 recessed in the axial direction at portions aligned with the reception holes 50 in the circumferential direction in radially inner portions relative to the reception holes 50. The guide grooves 54 are open on the axially inner surface and radially inner surfaces of the pad support portion 39a. Bottom surfaces of the guide grooves 54 are inclined toward the axially inner side (I) as approaching the reception holes 50 in the radial direction. That is, the groove depth of the guide grooves 54 becomes smaller as approaching the reception holes 50. The groove width of the guide grooves 54 is substantially the same as inner diameters of the reception holes 50.

In the second embodiment having the above configurations, the outer pad 5a is assembled to the pad support portion 39a as follows.

First, the outer pad 5a is provided on the radially inner side relative to the pad support portion 39a, and the pair of protrusions 33 (see FIG. 5) provided on an axially outer surface of the outer pad 5a are radially opposite to the pair of guide grooves 54 formed in the axially inner surface of the pad support portion 39. Then, the outer pad 5a is brought close to the pad support portion 39a from the radially inner side, and top end portions of the pair of protrusions 33 are inserted into the pair of guide grooves 54. The pair of pad-side engagement portions 26 (see FIG. 5) proceed in the radial direction from an opening of the support hole 45 opened to a radially inner surface of the pad support portion 39a, so that the pair of pad-side engagement portions 26 and the pair of yoke-side engagement portions 47 are concavo-convex engaged with each other in the circumferential direction. Then, the outer pad 5a is moved toward the radially outer side while the pair of protrusions 33 are guided by the pair of guide grooves 54 (bottom surfaces and side surfaces). At this time, since the groove depth of the guide grooves 54 becomes smaller as approaching the reception holes 50, the outer pad 5a moves slightly away from the axially inner surface of the pad support portion 39a. Accordingly, an elastic deformation amount (bending deformation amount) of the pair of pad-side engagement portions 26 gradually increases. Finally, with the top end portions of the pair of protrusions 33 being inserted into the pair of reception holes 50, the elastic deformation amount of the pair of pad-side engagement portions 26 is reduced, and the outer pad 5a is moved toward the axially inner surface of the pad support portion 39a.

In the assembly operation of the outer pad 5a according to second embodiment, the outer pad 5a is brought close to the pad support portion 39a from the radially inner side, and the pair of pad-side engagement portions 26 enter the support hole 45 in the radial direction. Thereby, the pair of pad-side engagement portions 26 and the pair of the yoke-side engagement portions 47 are concavo-convex engaged with each other in the circumferential direction. For this reason, no large force is necessary for the operation of assembling the outer pad 5a since two circumferential side portions of the pad spring are not pulled as in the structure in the related art. Therefore, the workability of assembling the outer pad 5a relative to the yoke 3b can be improved. Other configurations and operational effects are the same as those of the first embodiment.

Third Embodiment

Figure 10:
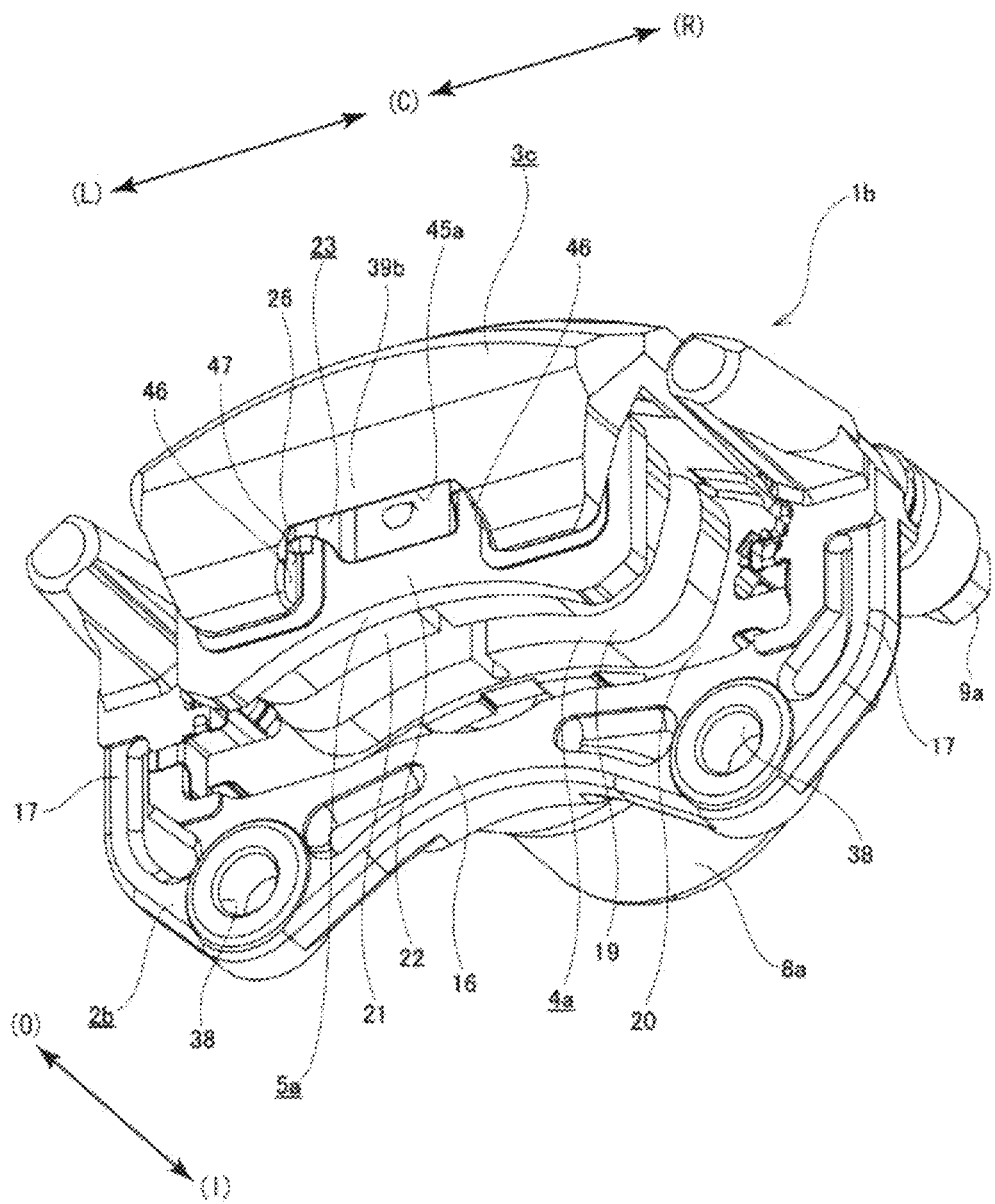
FIG. 10 is a perspective view of a floating disc brake according to a third embodiment of the present invention.
Figure 11:
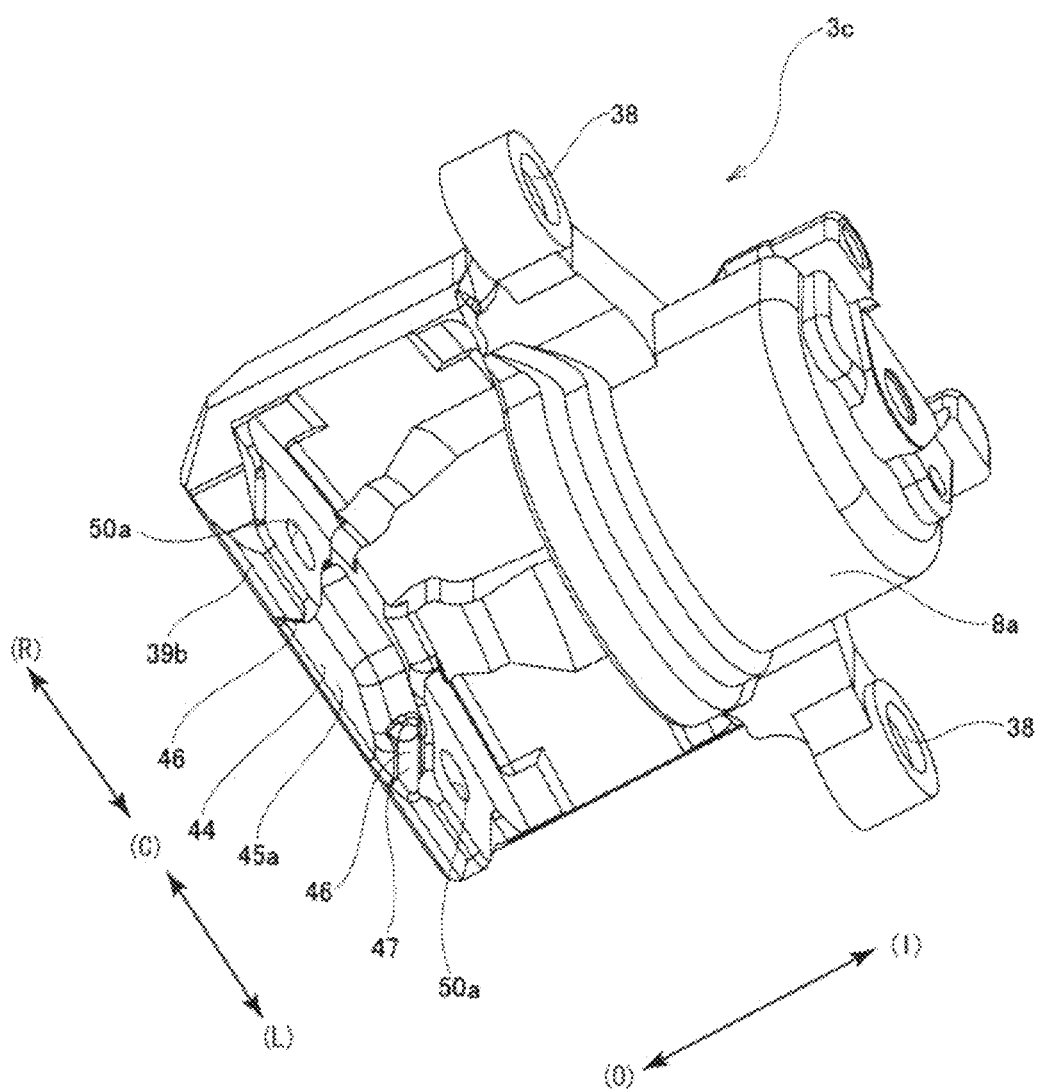
FIG. 11 is a perspective view of a yoke according to the third embodiment of the present invention when the yoke is taken out.
Figure 12:
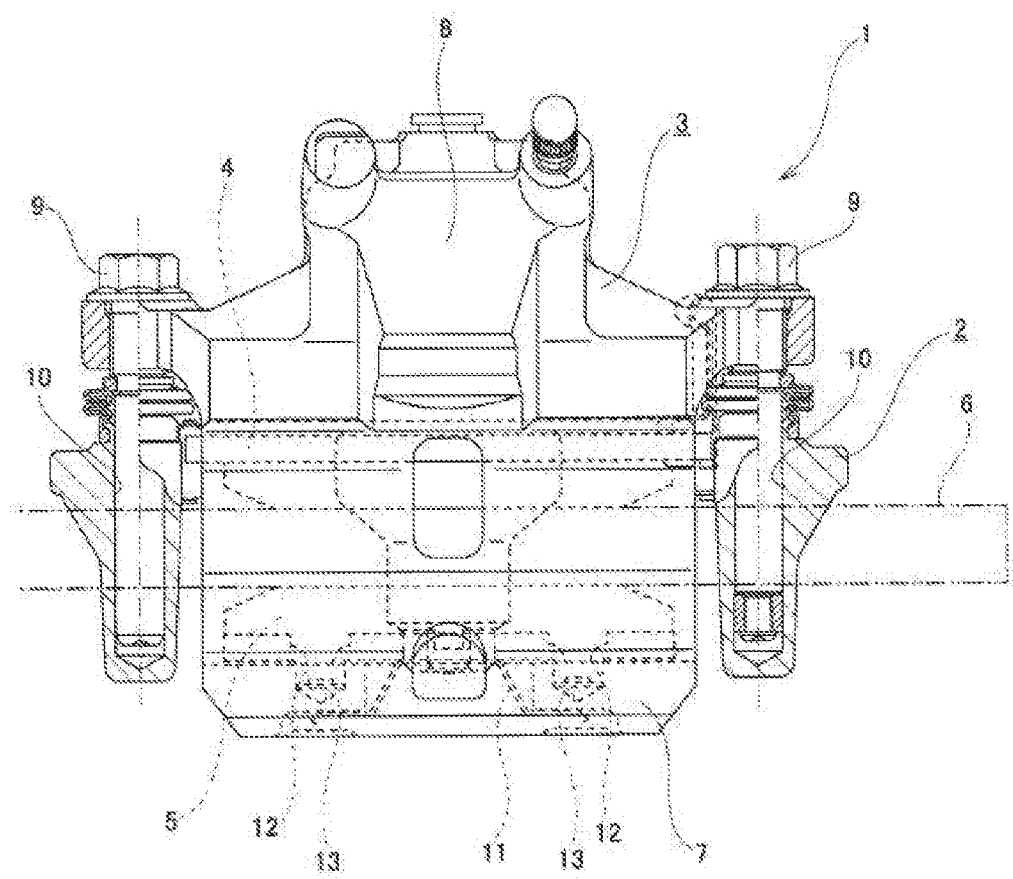
FIG. 12 is a cross-sectional view of a floating disc brake having a structure in the related art as viewed from a radially outer side.

The third embodiment will be described with reference to FIGS. 10 and 11. In a floating disc brake 1b according to the third embodiment, similarly to the structure in the related art, a cylinder portion 8a is integrated with a yoke 3c. Except a basic structure of the yoke 3c, a support structure of the outer pad 5a to the yoke 3c is the same as the structure in the first embodiment.

The yoke 3c in the third embodiment includes a pad support portion 39b on an axially outer portion and the cylinder portion 8a on an axially inner portion, and is supported to the support 2b in an axially movable manner. For this purpose, a pair of slide pins 9a are inserted into slide holes (not shown) provided in the support 2b. Each of the slide pins 9a has a base end portion supported and fixed to the yoke 3c.

The pad support portion 39b has a support hole 45a that is a through hole at a circumferentially middle portion. The support hole 45a is open on an axially inner surface and a radially inner surface of the pad support portion 39b. A radially inner half portion of the pad support portion 39b is also open on an axially outer surface. For this reason, the radially inner half portion of the pad support portion 39b is bifurcated. The support hole 45a has a substantially rectangular shape in a front view, and is provided with the pair of yoke-side engagement portions 47 at axially middle portions of the inner side surfaces 46 facing each other in the circumferential direction. The yoke-side engagement portions 47 are concave portions recessed respectively toward the circumferentially outer sides (L), (R).

Also in the third embodiment including the yoke 3c having the above configurations, the pair of pad-side engagement portions 26 constituting the pad spring 23 fixed to the axially outer surface of the outer pad 5a are respectively concavo-convex engaged with the pair of yoke-side engagement portions 47 formed in the support hole 45a in the circumferential direction. In this state, the pair of protrusions 33 (see FIG. 5) provided on the axially outer surface of the outer pad 5a are fitted into a pair of bottomed reception holes 50a formed in the axially inner surface of the pad support portion 39b. Accordingly, the outer pad 5a is supported on the axially inner side (I) of the pad support portion 39b.

In the third embodiment, the outer pad 5a can be assembled to the pad support portion 39b from the axially inner side (I) as in the first embodiment, or can be assembled from the radially inner side as in the second embodiment. In any case, the workability of assembling the outer pad 5a to the yoke 3c can be improved. Other configurations and operational effects are the same as those of the first and second embodiments.

When the present invention is implemented, a shape of a pad spring is not limited to the shape in the embodiments, and a pair of pad-side engagement portions may be provided on each of two circumferential side portions. A shape (sectional shape) of the pair of yoke-side engagement portions formed on inner side surfaces of a support hole is also not limited to the shape in the embodiments. The support hole is not limited to a bottomed hole that is not open on an axially outer surface, and may be a through hole that is also open also on the axially outer surface.

Here, features of the embodiments of the floating disc brake and the method of assembling the same according to the present invention will be briefly summarized below.

[1] A floating disc brake (1a, 1b) including:

a support (2a, 2b) that is fixed to a vehicle body and is adjacent to a rotor (6) that rotates together with a wheel;

an inner pad (4a) provided on an axially inner side (I) relative to the rotor;

an outer pad (5a) provided on an axially outer side (O) relative to the rotor; and a yoke (3a, 3b, 3c) supported to the support (2a, 2b) in an axially movable manner, the yoke including a pad support portion (39, 39a, 39b) that supports the outer pad (5a) on an axially outer side (O) of the outer pad (5a), wherein the outer pad (5a) includes, on its axially outer surface, a pair of pad-side engagement portions (26) formed of an elastic material, wherein the pad support portion (39, 39a, 39b) has a support hole (45, 45a) that is open on at least an axially inner surface of the pad support portion (39, 39a, 39b), and the support hole (45, 45a) is provided with a pair of yoke-side engagement portions (47) on inner side surfaces (46) of the support hole (45, 45a) that face each other in a circumferential direction, and wherein the pair of pad-side engagement portions (26) and the pair of yoke-side engagement portions (47) are concavo-convex engaged with each other in the circumferential direction.

[2] The floating disc brake (1a, 1b) according to [1], wherein the support hole (45, 45a) is open on a radially inner surface of the pad support portion (39, 39a, 39b).

[3] The floating disc brake (1a) according to [1] or [2], wherein the support hole (45) is a bottomed hole that is not open on an axially outer surface of the pad support portion (39, 39a).

[4] The floating disc brake (1b) according to [1] or [2], wherein the support hole (45a) is a through hole that is also open on an axially outer surface of the pad support portion (39b).

[5] The floating disc brake (1a, 1b) according to any one of [1] to [4], wherein the pair of pad-side engagement portions (26) are housed inside the support hole (45, 45a) without protruding outward from the support hole (45, 45a).

[6] The floating disc brake (1a, 1b) according to any one of [1] to [5], wherein the support hole (45, 45a) is provided with, on its two circumferential side portions of axially inner opening edge portions, a pair of guide surface portions (49) that are close to each other in the circumferential direction as approaching an axially outer side (O).

[7] The floating disc brake (1a, 1b) according to any one of [1] to [6], wherein each of the pair of pad-side engagement portions (26) is a convex portion protruding toward a circumferentially outer side (L), (R), and each of the pair of yoke-side engagement portions (47) is a concave portion recessed toward the circumferentially outer side (L), (R).

[8] The floating disc brake (1a, 1b) according to [7], wherein an axially inner surface of each of the pair of pad-side engagement portions (26) that is a convex portion and a surface facing an axially outer side (O) of each of the pair of yoke-side engagement portions (47) that is a concave portion are elastically abutted against each other, so that a force toward a circumferentially inner side (C) is applied to the pair of pad-side engagement portions.

[9] The floating disc brake (1a, 1b) according to [7] or [8], wherein the pair of pad-side engagement portions (26) of a pad spring that is a leaf spring are provided on two circumferentially outer sides of a base plate portion (25) fixed to the axially outer surface of the outer pad (5a), and each of the pair of pad-side engagement portions (26) includes a standing portion (27) bent toward an axially outer side (O) from a circumferentially outer end portion of the base plate portion (25), an overhang portion (28) bent toward the circumferentially outer side (L), (R) from an axially outer end portion of the standing portion (27), and a turned-back portion (29) folded toward an axially inner side (I) and a circumferentially inner side (C) from a circumstantially outer end portion of the overhang portion (28).

[10] The floating disc brake (1a, 1b) according to [9], wherein a continuous portion between the base plated portion (25) and the standing portion (27), a continuous portion between the standing portion (27) and the overhang portion (28), and a continuous portion between the overhang portion (28) and the turned-back portion (29) are each formed of a bent portion (first bent portion 30, second bent portion 31, and third bent portion 32) bent in an arc shape.

[11] The floating disc brake (1a, 1b) according to [10], wherein a radius of curvature ($r_{30}$) of a bent portion (first bent portion 30) constituting the continuous portion between the base plate portion (25) and the standing portion (27) is larger than a radius of curvature ($r_{31}$) of a bent portion (second bent portion 31) constituting the continuous portion between the standing portion (27) and the overhang portion (28), and is larger than a radius of curvature ($r_{32}$) of a bent portion (third bent portion 32) constituting the continuous portion between the overhang portion (28) and the turned-back portion (29).

[12] The floating disc brake (1a, 1b) according to any one of [1] to [11], wherein the outer pad (5a) includes a pair of protrusions (33) on two circumferentially outer sides relative to the pair of pad-side engagement portions (26) on the axially outer surface, and the pair of protrusions (33) protrude in an axial direction, and wherein the pair of protrusions (33) are inserted respectively into a pair of reception holes (50, 50a) provided on two circumferentially outer sides relative to the support hole (45, 45a) in the axially inner surface of the pad support portion (39, 39a, 39b).

[13] The floating disc brake (1a) according to [12], wherein the pad support portion (39a) has, on the axially inner surface, a guide groove (54) recessed in the axial direction at portions aligned with the reception holes (50) in the circumferential direction in radially inner portions relative to the reception holes (50).

[14] The floating disc brake (1a) according to [13], wherein a bottom surface of the guide groove (54) is inclined toward an axially inner side (I) as approaching the reception holes (50) in a radial direction.

[15] A method of assembling the floating disc brake (1a, 1b) according to [1], wherein the outer pad (5a) is brought close to the pad support portion (39, 39a, 39b) from an axially inner side (I) and the pair of pad-side engagement portions (26) are pressed against an axially inner opening edge portions of the support hole (45, 45a) so that the pair of pad-side engagement portions (26) are elastically deformed to a circumferentially inner side (C), the pair of pad-side engagement portions (26) enter the support hole (45, 45a) in an axial direction and are elastically restored at positions facing the pair of yoke-side engagement portions (47) in the circumferential direction, so that the pair of pad-side engagement portions (26) and the pair of yoke-side engagement portions (47) are concavo-convex engaged with each other in the circumferential direction.

[16] A method of assembling the floating disc brake (1a, 1b) according to [2], wherein the outer pad (5a) is brought close to the pad support portion (39a, 39b) from a radially inner side and the pair of pad-side engagement portions (26) proceed in a radial direction from an opening of the support hole (45, 45a) that is open on a radially inner surface of the pad support portion (39a, 39b), so that the pair of pad-side engagement portions (26) and the pair of yoke-side engagement portions (47) are concavo-convex engaged with each other in the circumferential direction.

The present invention is not limited to the embodiments described above and may be appropriately modified, improved, or the like. In addition, materials, shapes, sizes, numbers, arrangement positions, and the like of components in the embodiments described above are optional and are not limited as long as the present invention can be achieved.

This present application is based on Japanese Patent Application No. 2017-223406 filed Nov. 21, 2017, the contents of which are incorporated herein by reference.

INDUSTRIAL APPLICABILITY

According to the floating disc brake and the method of assembling the same of the present invention, the workability of assembling the outer pad to the yoke can be improved, and the degree of freedom regarding the design of the floating disc brake can be improved.

REFERENCE SIGNS LIST 1, 1a, 1b floating disc brake
2, 2a, 2b support
3, 3a, 3b, 3c yoke
4, 4a inner pad
5, 5a outer pad
6 rotor
7 claw portion
8, 8a cylinder portion
9, 9a slide pin
10 slide hole
11 pad spring
12 protrusion
13 reception hole
14 cylinder
15 support pin
16 base portion
17 arm portion
18 attachment hole
19 lining
20 back plate
21 lining
22 back plate
23 pad spring
24 crimping portion
25 base plate portion
26 pad-side engagement portion
27 standing portion
28 overhang portion
29 turned-back portion
30 first bent portion (bent portion)
31 second bent portion (bent portion)
32 third bent portion (bent portion)
33 protrusion
34 inner body
35 outer body
36 bridge portion
37 pressed portion
38 pin insertion hole
39, 39a, 39b pad support portion
40 pin receiving portion
43 cap nut
44 bottom portion
45, 45a support hole
46 inner side surface
47 yoke-side engagement portion
48 curved surface portion
49 guide surface portion
50 reception hole
51 abutment surface
52 cylinder body
53 attachment flange
54 guide groove
55 boot

The invention claimed is:

1. A floating disc brake comprising:
   a support that is fixed to a vehicle body and is adjacent to a rotor that rotates together with a wheel;
   an inner pad provided on an axially inner side relative to the rotor;
   an outer pad provided on an axially outer side relative to the rotor; and
   a yoke supported to the support in an axially movable manner, the yoke including a pad support portion that supports the outer pad on an axially outer side of the outer pad,
   wherein the outer pad includes, on its axially outer surface, a pair of pad-side engagement portions formed of an elastic material,
   wherein the pad support portion has a support hole that is open on at least an axially inner surface of the pad support portion, and the support hole is provided with a pair of yoke-side engagement portions on inner side surfaces of the support hole that face each other in a circumferential direction,
   wherein the pair of pad-side engagement portions and the pair of yoke-side engagement portions are concavo-convex engaged with each other in the circumferential direction, and
   wherein the support hole is a bottomed hole that is not open on an axially outer surface of the pad support portion.

2. The floating disc brake according to claim 1, wherein the support hole is open on a radially inner surface of the pad support portion.

3. A method of assembling the floating disc brake according to claim 2,
   wherein the outer pad is brought close to the pad support portion from a radially inner side and the pair of pad-side engagement portions proceed in a radial direction from an opening of the support hole that is open on a radially inner surface of the pad support portion, so that the pair of pad-side engagement portions and the pair of yoke-side engagement portions are concavo-convex engaged with each other in the circumferential direction.

4. The floating disc brake according to claim 1, wherein the pair of pad-side engagement portions are housed inside the support hole without protruding outward from the support hole.

5. The floating disc brake according to claim 1, wherein the support hole is provided with, on its two circumferential side portions of axially inner opening edge portions, a pair of guide surface portions that are close to each other in the circumferential direction as approaching an axially outer side.

6. The floating disc brake according to claim 1, wherein each of the pair of pad-side engagement portions is a convex portion protruding toward a circumferentially outer side, and each of the pair of yoke-side engagement portions is a concave portion recessed toward the circumferentially outer side.

7. The floating disc brake according to claim 6, wherein an axially inner surface of each of the pair of pad-side engagement portions that is a convex portion and a surface facing an axially outer side of each of the pair of yoke-side engagement portions that is a concave portion are elastically abutted against each other, so that a force toward a circumferentially inner side is applied to the pair of pad-side engagement portions.

8. The floating disc brake according to claim 6, wherein the pair of pad-side engagement portions of a pad spring that is a leaf spring are provided on two circumferentially outer sides of a base plate portion fixed to the axially outer surface of the outer pad, and each of the pair of pad-side engagement portions includes a standing portion bent toward an axially outer side from a circumferentially outer end portion of the base plate portion, an overhang portion bent toward the circumferentially outer side from an axially outer end portion of the standing portion, and a turned-back portion folded toward an axially inner side and a circumferentially inner side from a circumstantially outer end portion of the overhang portion.

9. The floating disc brake according to claim 8, wherein a continuous portion between the base plated plate portion and the standing portion, a continuous portion between the standing portion and the overhang portion, and a continuous portion between the overhang portion and the turned-back portion are each formed of a bent portion bent in an arc shape.

10. The floating disc brake according to claim 9, wherein a radius of curvature of a bent portion constituting the continuous portion between the base plate portion and the standing portion is larger than a radius of curvature of a bent portion constituting the continuous portion between the standing portion and the overhang portion, and is larger than a radius of curvature of a bent portion constituting the continuous portion between the overhang portion and the turned-back portion.

11. The floating disc brake according to claim 1, wherein the outer pad includes a pair of protrusions on two circumferentially outer sides relative to the pair of pad-side engagement portions on the axially outer surface, and the pair of protrusions protrude in an axial direction, and
wherein the pair of protrusions are inserted respectively into a pair of reception holes provided on two circumferentially outer sides relative to the support hole in the axially inner surface of the pad support portion.

12. The floating disc brake according to claim 11, wherein the pad support portion has, on the axially inner surface, a guide groove recessed in the axial direction at portions aligned with the reception holes in the circumferential direction in radially inner portions relative to the reception holes.

13. The floating disc brake according to claim 12, wherein a bottom surface of the guide groove is inclined toward an axially inner side as approaching the reception holes in a radial direction.

14. A method of assembling the floating disc brake according to claim 1,
wherein the outer pad is brought close to the pad support portion from an axially inner side and the pair of pad-side engagement portions are pressed against axially inner opening edge portions of the support hole so that the pair of pad-side engagement portions are elastically deformed to a circumferentially inner side, the pair of pad-side engagement portions enter the support hole in an axial direction and are elastically restored at positions facing the pair of yoke-side engagement portions in the circumferential direction, so that the pair of pad-side engagement portions and the pair of yoke-side engagement portions are concavo-convex engaged with each other in the circumferential direction.

* * * * *